United States Patent [19]

Cornil

[11] 3,941,144

[45] Mar. 2, 1976

[54] SUPPLY CIRCUITS FOR FLUIDS UNDER PRESSURE

[75] Inventor: Jean-Philippe Cornil, Houilles, France

[73] Assignee: Service National dit: Gaz de France, France

[22] Filed: May 14, 1974

[21] Appl. No.: 469,768

[30] Foreign Application Priority Data

May 16, 1973 France .............................. 73.17815
Oct. 11, 1973 France .............................. 73.36356

[52] U.S. Cl. .............................. 137/110; 137/599.1
[51] Int. Cl.[2] .............................. G05D 16/04
[58] Field of Search .............................. 137/110, 599.1

[56] References Cited

UNITED STATES PATENTS 3,135,282 6/1964 Gray .............................. 137/110 UX
3,689,237 9/1972 Stark et al. .............................. 137/110 UX

*Primary Examiner*—Robert G. Nilson
*Attorney, Agent, or Firm*—Bucknam and Archer

[57] ABSTRACT

This invention relates to supply circuits for fluids under pressure, particularly gases. Such circuits ordinarily comprise a main pipe between a source of fluid and a point of consumption, and to which main pipe is fitted a regulator and pressure-reducer and at least one obturator is normally fitted to this main pipe downstream of the regulator and pressure-reducer. In such an arrangement, the present invention provides means for minimising over-pressures consequent on the said obturator closing which are caused by the inertia of the regulator, which means is fitted as a by-pass to the main pipe on either side of the regulator and pressure-reducer. In one preferred embodiment, this means comprises a venturi and a reservoir which is connected by a first pipe means to the venturi and wherein the venturi is fitted to a second pipe means as a by-pass to the regulator and pressure-reducer, a valve being provided in the second pipe means upstream of the venturi.

8 Claims, 5 Drawing Figures

SUPPLY CIRCUITS FOR FLUIDS UNDER PRESSURE

BACKGROUND OF THE INVENTION

The present invention relates to supply circuits for fluids under pressure, and particularly to assemblies in such circuits to eliminate or substantially minimise over-pressures resulting from sudden interruptions in the flow of a gaseous fluid in the circuit in any process in which the pressure of the fluid in question is regulated cyclically by an obturator which employs all-or-nothing operation, such as an electrical valve of the kind which are found particularly in gas-fired reheating furnaces.

Conventional reheating furnaces are fed with gas at a constant pressure by means of regulator and pressure-reducer which is a pneumatically operated device which works in an independent fashion by taking energy directly from the gas in the supply pipe, which latter will hereinafter be referred to as "the main pipe".

However, the heating members and their safety devices for their part are electrically operated. In particular, the gas-flow valve is an electrical valve which opens and closes fully and rapidly in a cyclic fashion.

This electrical valve therefore employs very high-speed all-or-nothing operation, taking only a few hundredths of a second to open or close, whereas the regulator and gas-pressure reducer usually has a response time of the order of a second or half a second when carrying out the same operation.

Consequently, when the electrical valve closes, the gas continues to flow in the part of the main pipe between the regulator and pressure-reducer and the said electrical valve for the length of time which the regulator and pressure-reducer takes to close fully.

This excess quantity of gas gives rise to an over-pressure which often exceeds the ± 15% usually fixed as a maximum to ensure proper combustion and over-pressure therefore triggers the burner's safety device and holds it out. It would only be held out temporarily and the installation could be put back into operation if the over-pressure downstream of the regulator and pressure-reducer were not maintained. However, if the installation is properly built it allows no means of escape. Consequently, the over-pressure is maintained and it is therefore necessary to take manual action to put the installation back into operation. When the electrical valve opens similar phenomena occur but in the opposite direction.

It was thought that this drawback could be overcome by fitting a valve to the main pipe to release the excess gas. However, even apart from the fact that this solution, which involves the loss of gas, is not very acceptable from an economic point of view, it is also normally not very suitable from a technical point of view because of the long response time of the valve in question.

It is an object of the present invention to remove or reduce these differences in the duration and level of pressures in such a way that installations can operate normally, with their safety devices functioning in the normal way and without the maximum pressure limits of ± 15% which have to be observed for proper combustion being exceeded.

Another object of the invention is to provide an assembly which may easily be fitted to gas pipes equipped with a conventional regulator and pressure-reducer electrical valve combination with the minimum of expense, and which operates in such a way as to meet the conditions mentioned without requiring manual intervention.

SUMMARY OF THE INVENTION

In accordance with the present invention there is provided a circuit for conveying a preferably gaseous fluid under pressure of the kind which comprises a pipe between a source of fluid and a point of consumption, a regulator and pressure-reducer fitted to the pipe, at least one obturator fitted to the pipe downstream of the said regulator and pressure-reducer, and wherein an assembly which is intended to minimise or eliminate the over-pressures which arise as a result of the said obturator closing and which are caused by the inertia of the regulator, is mounted as a by-pass to the said pipe on either side of the regulator and pressure-reducer.

A fundamental advantage of the present invention thus becomes apparent: while the regulator is operating, an under-pressure is created in a reservoir forming part of the system and, when the obturator closes, the excess gas which the regulator and pressure-reducer allows through into the section of the main pipe situated between it and the obturator is drawn into the reservoir. When the obturator opens, because there is no longer an over-pressure in the pipe, the regulator and flow-reducer is able to open more quickly and consequently the under-pressure which is usually encountered at the time of opening is made up for to a sufficient degree not to disturb the operation of the installation.

However, in this embodiment of the assembly, it is apparent that the entire surplus quantity of gas which exists in the main pipe at the moment at which the obturator closes is transferred to the reservoir through a venturi.

Now, bearing in mind the geometrical shape which this venturi needs to take if it is to fulfil its principal function, effectively, namely to create a relative pressure lower than that in the interior of the reservoir, it presents as a corollary a considerable resistance to the flow of the excess quantity of gas.

Thus, the flow of this excess quantity of gas through the venturi may become so slow, relatively speaking, that the time taken to transfer the said excess to the reservoir makes it necessary for the safety devices associated with the installation to have a delay.

Thus, the present invention also has as an object the provision of other embodiments of this supply circuit in which the time taken to transfer the excess quantity of gas to the reservoir is reduced to a level sufficiently low to make it unnecessary to slug the safety devices of the installation in this way.

This object is achieved in accordance with the invention by means of a supply circuit which is characterised in that it includes a duct which connects the reservoir directly to the section of the pipe between the said regulator and pressure-reducer and the said obturator without going through the said venturi, this duct also having a control valve fitted to it.

A second advantage of the supply circuit according to the present invention thus becomes apparent and this lies in the fact that if there is a pipe which connects the main pipe directly to the reservoir, virtually all the excess gas can flow through this pipe and is thus no longer obliged to pass through the venturi, which results in a considerable reduction in the time taken to transfer this excess and in the momentary pressure peak which occurs when the obturator closes.

BRIEF DESCRIPTION OF THE DRAWINGS

Other features and advantages of the present invention will become apparent from pursuing the following description of various embodiments of the proposed supply circuit, which is given as a non-limiting illustrative example and which refers to the accompanying drawings, in which.

SPECIFIC DESCRIPTION OF PREFERRED EMBODIMENTS

Figure 1:
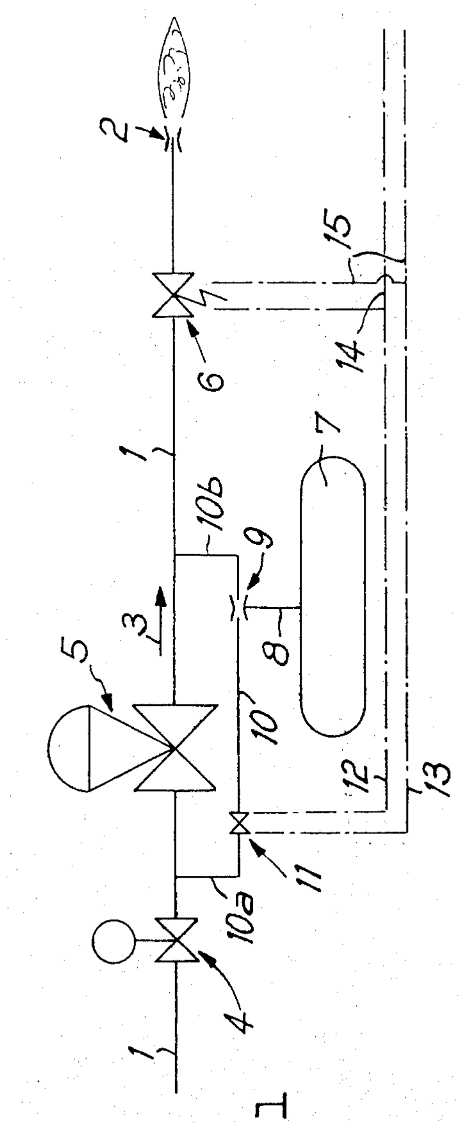
FIG. 1 is a diagram showing the principle of a first embodiment of the supply circuit of the invention.

Referring now to the drawings, as can be seen from FIG. 1, the supply circuit according to the invention includes a main pipe 1 through which flows a combustible gas which is on its way to a burner 2 associated with a reheating furnace installation which is not shown.

Along its path through the main pipe 1 the gas passes through, in succession and in the direction shown by arrow 3, a safety valve 4, a regulator and pressure-reducer 5 and an electrical flow-valve 6 of which the type and arrangement are all known in the art and therefore need no further explanation or description.

The supply circuit proper according to the invention is chiefly formed by a reservoir 7, when this term is understood to mean a hollow, closed container which contains a space of selected, given size, the container being connected by a first pipe 8 to a venturi 9.

Figure 5:
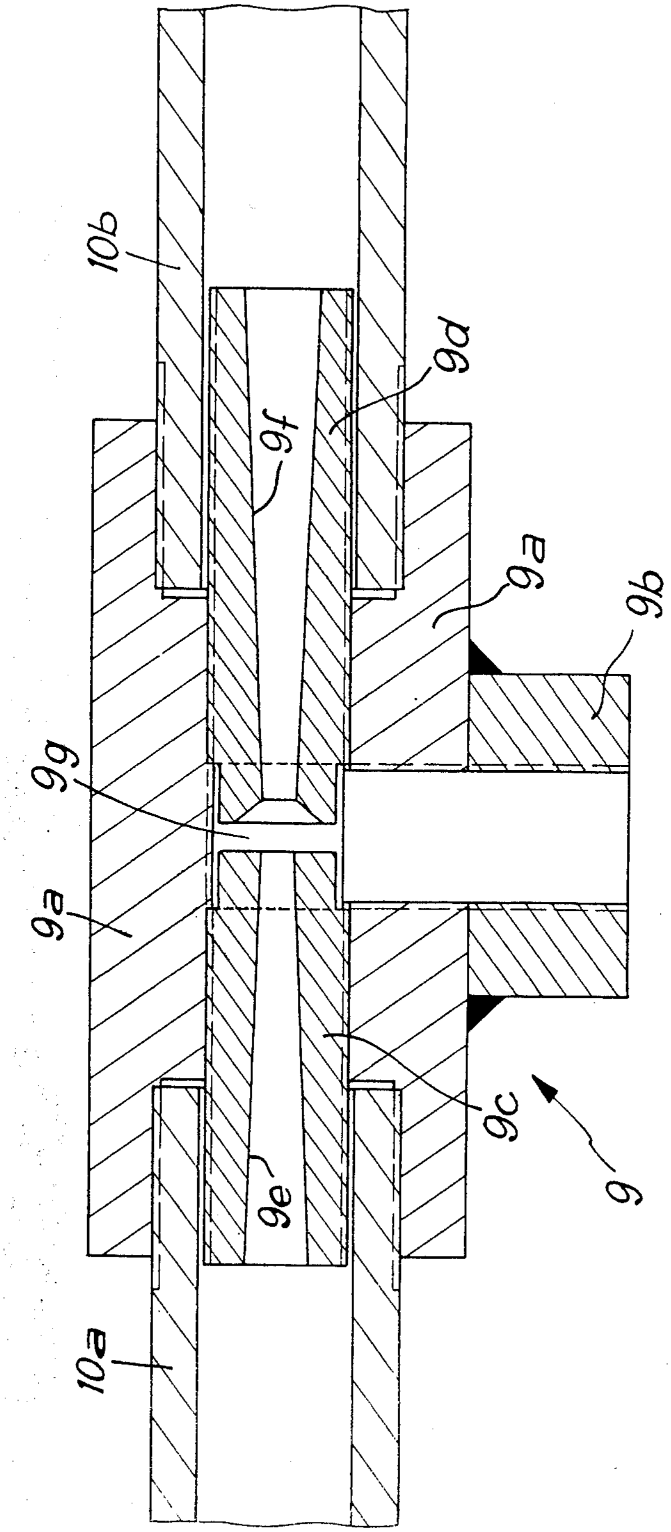
FIG. 5 is a view in axial cross-section of a venturi as used in the supply circuits in FIGS. 1 to 4.

As can be seen in greater detail in FIG. 5, the venturi 9 is formed by a main tubular member in the form of a T which is made up of an internally threaded tube 9*a* which forms the cross-piece of the T, which is welded to the end of another internally threaded tube 9*b* at right angles. Into tube 9*a* are screwed two cylinders 9*c* and 9*d*, through which are pierced two co-axial tapering holes, a convergent one 9*e* and a divergent one 9*f*, which produce a venturi throat 9*g* into which tube 9*b* opens. The width of the throat 9*g* and its exact position in relation to the end of tube 9*b* may be adjusted by screwing the two cylinders 9*c* and 9*d* in or out.

The end of pipe 8 is screwed into tube 9*b* so as to form a seal, while a second pipe 10 is made up of two sections 10*a* and 10*b* each of which is screwed into one end of tube 9*a*. The first, 10*a*, of these sections connects the end of tube 9*a* which contains cylinder 9*c* to the section of the main pipe 1 situated between the safety valve 4 and the regulator and pressure-reducer 5, i.e. the section of the said main pipe situated immediately upstream of the said regulator and pressure-reducer in relation to the direction in which the gas flows, while the second section, 10*b*, connects the other end of tube 9*a*, the one which contains cylinder 9*d*, to the section of the main pipe 1 between the regulator and pressure-reducer 5 and the electrical flow-valve 6, i.e. the section of the said main pipe situated immediately downstream of the said regulator and pressure-reducer in relation to the same directional reference. The venturi 9 is thus connected as a by-pass to the main pipe 1 in parallel with the regulator and pressure-reducer 5. The cross-section of pipe 8 is larger than that of the inlet to the divergently tapering hole 9*f* and the cross-section of section 10*b* of pipe 10 is advantageously made greater than that of pipe 8 so as to avoid major pressure losses and thus to allow venturi 9 to operate under optimum conditions, the said section 10*b* and the said pipe 8 being both as short as possible.

A valve is inserted along section 10*a* of pipe 10.

In a first embodiment, which is shown in FIG. 1, the valve in question is an electrical valve 11. It is therefore connected by two leads 12 and 13 to an electrical circuit 14, 15 which controls the electrical flow-valve 6, using a known control system which is not shown, thus ensuring that the two electrical valves 6 and 11 operate simultaneously.

Figure 2:
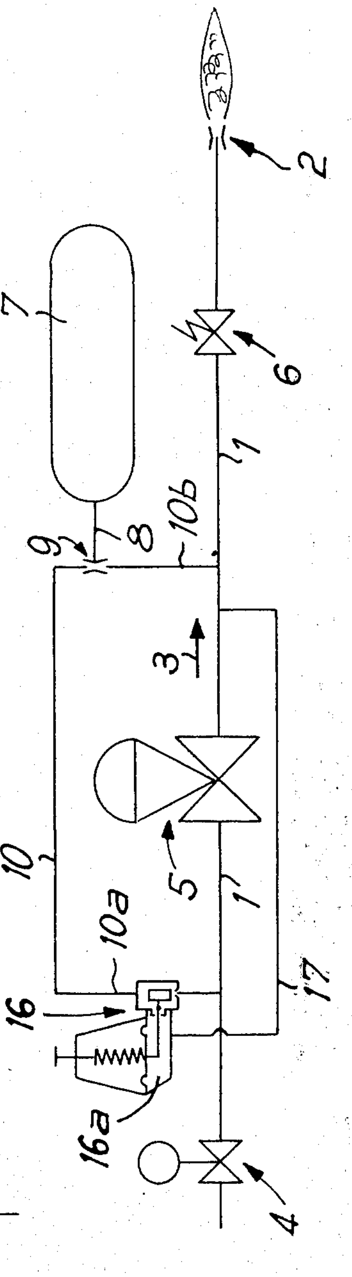
FIG. 2 is a diagram showing the principle of a second embodiment of the supply circuit of the invention.

In a second embodiment, which is shown in FIG. 2, the same members are once again present and bear the same reference numerals, except that the electrical valve 11 is replaced by a pneumatic valve 16.

The control member 16*a* for this pneumatic valve 16 is therefore connected by a third pipe 17 to the section of the main pipe 1 situated immediately downstream of the regulator and pressure-reducer 5 so that a slight increase in pressure in this section of the said main pipe will result in the said pneumatic valve 16 closing.

The reservoir 7 is made of a material which is sufficiently strong to meet current safety regulations both as regards its ability to withstand the maximum pressure of any gas likely to be introduced into it, and as regards its ability to withstand the pressure of the atmosphere when a vacuum is produced within it. Otherwise, its volume is determined simply on the basis of the physical valves involved in the problem, namely the technical characteristics of the regulator and pressure-reducer 5, of the electrical flow-valve 6 and of valves 11 or 16, the volumes of the various pipes and the pressure of the gas flowing through the pipes and of the residual gas in reservoir 7, by means of a conventional calculation such that, as will be better understood after reading the description of the way in which the device operates, the pressure prevailing in the section of main duct 1 between the regulator and pressure-reducer 5 and electrical valve 6 is, once the two latter are closed, less than the maximum limiting valve at which safety valve 4 is triggered.

It is even possible, in a particularly advantageous embodiment, to provide a reservoir 7 which is sufficiently large for the pressure in question to be less than the minimum pressure required to close and seal the regulator and pressure-reducer 5. Thus, the latter will open slightly and itself allow through just that amount of gas which is necessary to bring the pressure in the area concerned up to the minimum level necessary for it to close fully. This makes it certain that the desired result, namely the closure of regulator and pressure-reducer 5, will be achieved with the lowest possible gas pressure immediately downstream of the regulator.

From the above may be deduced the following method of operation: assuming burner 2 to be operating, the regulator and pressure-reducer 5 and valves 4, 6 and 11 or 16 are open. The gas passing through the venturi 9 causes a drop in pressure in the throat of the venturi and because of this it sucks out the gas contained in the reservoir 7 and a partial vacuum thus arises in the latter.

Obviously the rate of flow through the ventury 9 is chosen to be compatible with the various rates at which burner 2 operates.

When burner 2 is turned off as a result of the virtually instantaneous closure of electrical valve 6, in the first embodiment electrical valve 11 is closed at the same time, while in the second embodiment pneumatic valve 16 is closed with a slight delay for which allowance may easily be made when the volume of the reservoir 7 in this second embodiment is decided on. Consequently, the gas which continues to flow through the regulator and pressure-reducer 5 will no longer accumulate in the section of the main pipe situated immediately downstream of the regulator and create the undesirable pressure increase which is found in known arrangements, but rather will fill the space available in the reservoir 7, the pressure in which will rise again progressively until, as seen above, it stabilises at a selected level lying between the minimum pressure required for the regulator and pressure-reducer 5 to close, which is advantageously selected in the manner stated, and the maximum permissible pressure at which the burner can be re-lit properly without manual assistance.

In effect, to re-establish the supply to burner 2, it is merely necessary to re-open electrical valve 6, and thus electrical valve 11 in the first embodiment, for the said burner 2 to be supplied again in the normal way and to be in a position to be lit immediately. Since, as soon as the said electrical valve 6 opens, the supply pressure is substantially the normal supply pressure, it is thus possible for the regulator and pressure-reducer 5 to re-open progressively without any difficulty.

Figure 3:
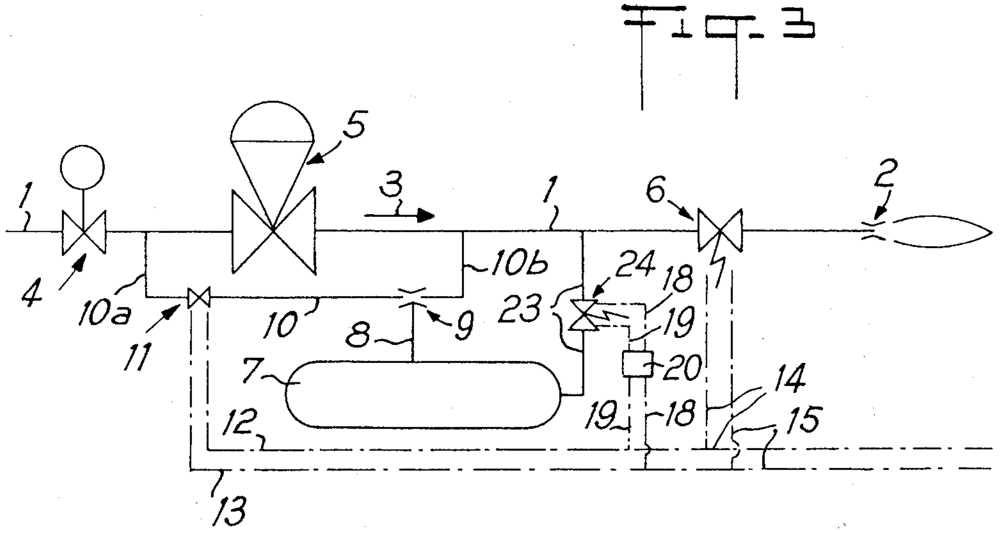
FIG. 3 is a diagram showing the principle of a third embodiment.

As can be seen in FIG. 3, it is also possible for the supply circuit according to the invention to include a duct 23 of relatively large cross-section which connects the section of the main pipe 1 between the regulator and pressure-reducer 5 and the electrical flow-valve 6 to the reservoir 7 directly without going via the venturi 9.

A control valve is fitted to this duct 23.

In a third embodiment, which is shown in FIG. 3, the valve in question is an electrical valve 24. This electrical valve 24 is controlled by means of leads 18 and 19 which are connected, via a delaying relay 20, to the leads 14 and 15 from the electrical circuit controlling the electrical flow-valve 6.

Figure 4:
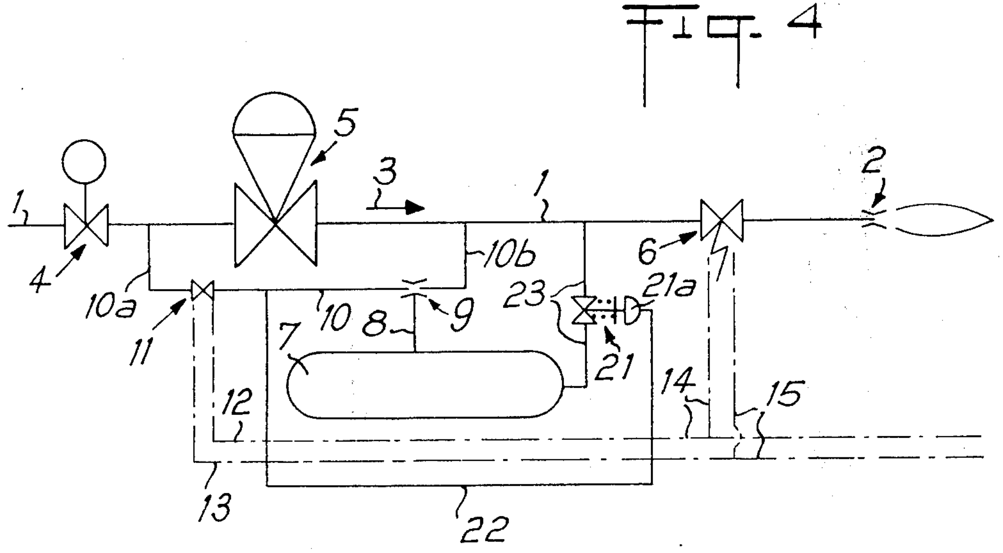
FIG. 4 is a diagram showing the principle of a fourth embodiment.

In a fourth embodiment, which is shown in FIG. 4, the control valve fitted to duct 23 is a pneumatic flap or diaphragm valve 21 the control member 21*a* of which is connected by a pipe 22, which serves as a pressure take-off, to that section 10*a* of the pipe 10 to which the venturi 9 is fitted which is situated immediately upstream of the venturi 9 but downstream of the electrical valve 11.

Since the principle on which members 1 to 15 in these third and fourth embodiments operate is the same as that on which the members 1 to 15 described in the first two embodiments operate, the way in which they operate need not be further described here. Thus, as far as the aforementioned principle of operation is concerned, all that will be described is the way in which the new members 18 to 24 operate.

Thus, in the case of the third embodiment described above, the signal for electrical flow-valve 6 and electrical valve 11 to close causes electrical valve 24 to open, the latter operating the opposite way round from the two electrical valves 6 and 11.

Similarly, in the case of the second embodiment described above, the pressure drop downstream of electrical valve 11 which follows its closure is detected via pipe 22 by the control member 21*a* associated with pneumatic valve 21 and the control member 21*a* then causes the said valve 21 to open, thus causing the excess gas to be drawn rapidly into the said reservoir 7.

It will be noted that in both cases the opening of the valve associated with pipe 16 (electrical valve 24 or pneumatic valve 21) is brought about with a certain delay in relation to the closure of electrical valves 6 and 11, this delay being due either to the presence of the delaying relay 20 or to the inherent response time of the pneumatic valve 21.

This delay is in fact essential in view of the fact that opening needs to take place at the exact time when the pressure in the section of the main pipe between the regulator and pressure-reducer 5 and the electrical valve 6 begins to rise when the said regulator and pressure-reducer 5 closes. If the opening in question occurs at too early a stage, the opposite effect will be achieved from that desired; an additional flow demand will be created which will result in the regulator and pressure-reducer 5 opening and the pressures in reservoir 7 and main duct 1 will tend to balance before the said regulator and pressure-reducer closes, which will negate the effect sought.

I claim:

1. A supply circuit for a gaseous fluid under pressure which comprises a source of gaseous fluid, and a point of consumption of said gaseous fluid, a main pipe between said source of fluid and said point of consumptiion, a regulator and pressure-reducer fitted to said main pipe, at least one obturator fitted to the said main pipe downstream of the said regulator and pressure-reducer, means for minimizing over-pressures resulting from the closing of the said obturator which are caused by the inertia of the regulator, said means being arranged as a by-pass to said main pipe on either side of the regulator and pressure-reducer.

2. A supply circuit according to claim 1, in which the means for minimizing the over-pressures comprises a venturi and a reservoir which is connected by a first pipe means to the said venturi, wherein said venturi is fitted to a second pipe means as a by-pass to said regulator and pressure-reducer, and wherein a valve is provided in said second pipe means upstream of said venturi.

3. A supply circuit according to claim 2, wherein said valve fitted in said second pipe means is an electrical valve controlled by the same electrical circuit as controls the obturator situated in said main pipe.

4. A supply circuit according to claim 2, wherein said valve mounted in said second pipe means is a pneumatic valve incorporating a control member which is connected by a third pipe means to the section of said main pipe situated between said regulator and pressure-reducer and said obturator.

5. A supply circuit according to claim 2, wherein the diameter of said first pipe means is less than that of the section of said second pipe means situated between said venturi and its connection and to said section of the main pipe situated between said regulator and pressure-reducer and said obturator.

6. A supply circuit according to claim 2, which further includes a duct which connects said reservoir directly to said section of said main pipe situated between said regulator and pressure-reducer and said obturator without going through said venturi, said duct also having a control valve fitted therein.

7. A supply circuit according to claim 6, wherein said control valve fitted in said duct which connects said reservoir directly to said main pipe without going through said venturi is an electrical valve which is controlled via a delaying relay by the same electrical circuit as that which controls obturator situated in said main pipe.

8. A supply circuit according to claim 6, wherein said control valve fitted in said duct which connects said reservoir directly to said main pipe without going through said venturi is a pneumatic flap or diaphragm valve incorporating a control member which is connected by a pipe serving as a pressure take-off to that section of said second pipe means to which said venturi is fitted and which is situated immediately upstream of said venturi and downstream of said electrical control valve.

* * * * *